March 13, 1973   W. B. SAMPSON ET AL   3,720,777
LOW LOSS CONDUCTOR FOR A.C. OR D.C. POWER TRANSMISSION
Filed Aug. 25, 1971   3 Sheets-Sheet 1

Fig. I

INVENTORS
William B. Sampson
Meyer Garber

INVENTORS
William B. Sampson
Meyer Garber

United States Patent Office 3,720,777
Patented Mar. 13, 1973

3,720,777
LOW LOSS CONDUCTOR FOR A.C. OR D.C.
POWER TRANSMISSION
William Boyd Sampson, Bellport, and Meyer Garber, Patchogue, N.Y., assignors to the United States of America as represented by the United States Atomic Energy Commission
Filed Aug. 25, 1971, Ser. No. 174,745
Int. Cl. H01v 11/00
U.S. Cl. 174—15 C
2 Claims

ABSTRACT OF THE DISCLOSURE

Compact, easy to fabricate, noninductive, low surface magnetic field superconductor transmission line that has minimal stray fields.

BACKGROUND OF THE INVENTION

This invention was made in the course of, or under a contract with the United States Atomic Energy Commission.

In the field of superconductors, a need exists for transmission lines for alternating currents in the frequency range of up to 60 Hz. or more. Possible superconductors that have been considered on the basis of their relatively high critical currents $I_c$, relatively high critical fields $H_c$ and/or relatively high critical temperatures $T_c$, have been Nb, $Nb_3Sn$ and NbTi. However, these and the other superconductors known heretofore, have been difficult or expensive to fabricate and/or to operate. Moreover, high pulsing losses have been a problem, particularly at high currents and/or fields. Another problem has been flux jump instabilities, as those terms are understood in the art from the March 1967 issue of "Scientific American," which describes "flux jumps" as temporary or unpredictable, localized, normal resistance areas in a superconductor, due, for example, to the presence of magnetic fields, temperatures, and/or currents, which may alone or in combination have resulted from or that may have caused the exceeding of the critical current $I_c$ at a localized superconductor area. Additionally, large areas of the superconductor may sometimes go "normal," creating a dangerous and sudden release of large amounts of stored energy.

It is an object of this invention, therefore, to provide a new and improved means of applying superconductors to varying and/or alternating currents;

It is another object to provide a superconductor transmission line for alternating or pulsed currents;

It is a further object to provide compact, easy to fabricate, superconductor apparatus;

It is another ebject to keep a superconducting transmission line from going into its normal resistance state and/or from suddenly releasing large amounts of stored energy;

A still further object is to provide an electrical transmission line having minimal stray fields and A.C. losses.

SUMMARY OF THE INVENTION

This invention provides a superconductor transmission line for pulsed or alternating currents up to 60 Hz. or more. More particularly, this invention provides a compact, minimal stray field, easy to fabricate superconductor transmission line for alternating currents having frequencies of up to 60 Hz. and operating at temperatures up to the critical temperatures of the superconductor used. In one embodiment, this invention provides parallel, spaced apart, interleaved, superconductor ribbons arranged to have low power losses. In another aspect this invention shapes the ribbon edges so as to allow the maximum interribbon voltage. It is also advantageous to provide improved connections for, and low vibration in, superconducting transmission lines. With the proper selection and arrangement of elements, as described in more detail hereinafter, the desired transmission line is achieved.

The above and further novel features and objects of this invention will appear more fully from the following detailed description when read in connection with the accompanying drawing, and the novel features of some embodiments will be pointed out in the appended claims.

DESCRIPTION OF ONE EMBODIMENT

Figure 1:
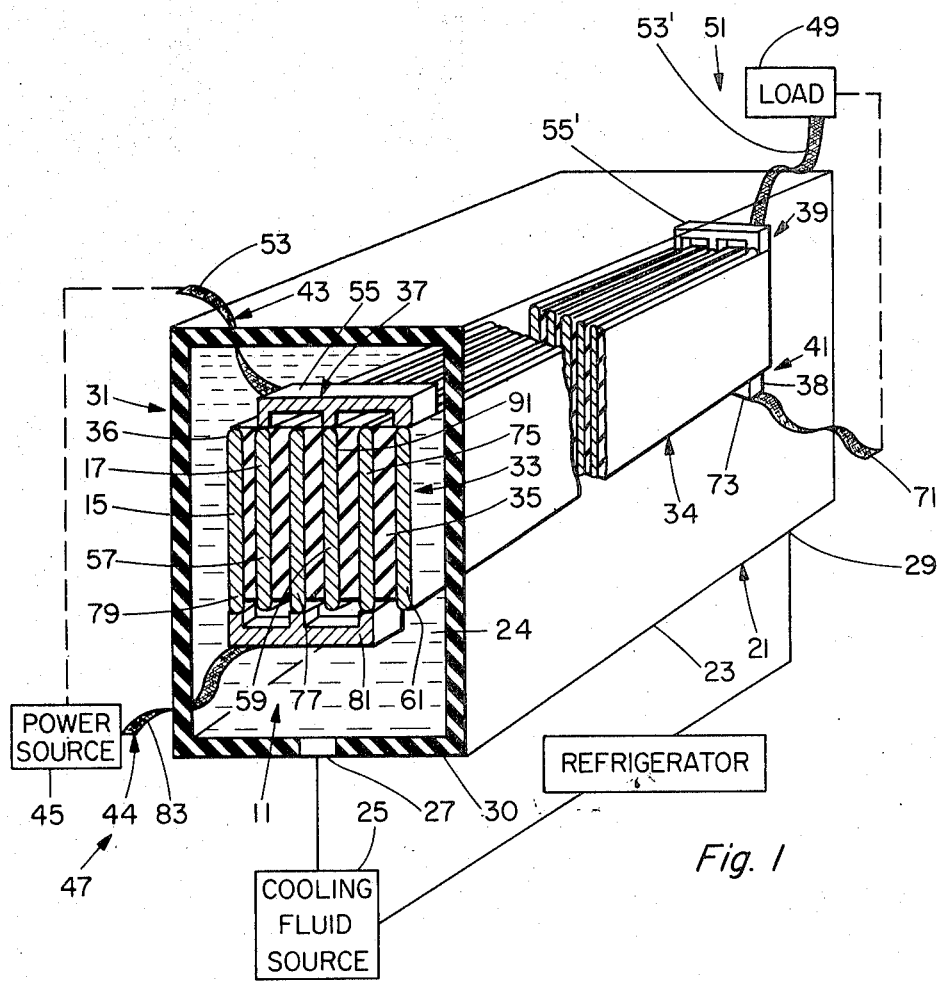
FIG. 1 is a partial three-dimensional view of one embodiment of the apparatus of this invention.

This invention is useful in transmitting alternating currents. As such this invention is useful in the field of transmission lines. However, as will be understood in more detail from the following, this invention is useful in many applications where alternating or pulsed currents are required. Thus, for example, this invention is useful in the field of accelerators, such as described in the above-identified copending application, where pulsed currents are required for producing pulsed magnetic fields for deflecting and/or focusing charged particles at uniform flat-topped or variable magnetic fields. It will also be understood that the apparatus of this invention can be used for transmitting direct currents. As such this device will be especially beneficial during changes of the D.C. load level.

In understanding this invention for providing a transmission line for alternating currents, it is known that cryogenically cooled, superconductor ribbons can be used for conducting pulsed currents, as described in copending application S.N. 22,944, filed Mar. 26, 1970, now U.S. Pat. 3,638,154; b Sampson, the co-inventor of this application, and another who assigned that the application to the assignee of this application. As described in that copending Sampson et al. application, superconductor ribbons are coated with a normal resistance matrix to enhance the stabilization of the superconductors, for example, by reducing the effects of flux jumps. Advantageously these ribbons comprise matrix stabilized braided superconductor filaments, but in accordance with this invention, they may alternately have a substantially fillet-shaped rectangular cross-section that is cooled by a cryogenic cooling fluid.

Suitable matrix materials advantageously comprise copper or silver, although other materials having a resistance greater than the superconductor and/or that provide a heat sink may be used. Such other matrix materials, comprise lead, cadmium, indium, aluminum, thallium, tin, titanium, niobium, vanadium, hafnium, magnesium, iron, nickel, bismuth, cobalt, zirconium, beryllium, and alloys of the above and others such as stainless steel, and Nichrome. Shorting means, comprising metallic members that are interleaved with the braided ribbons may be used. Strengthening means, comprising metallic members and/or thermal setting plastics impregnated in the braided ribbons may also be used.

The described superconductor ribbons, as well as one cryogenic cooling means therefor, are understood from the above-mentioned copending application, which is incorporated by reference herein. Such superconductor ribbons and cryogenic cooling means are employed in this invention. The rectangular cross-section, fillet-shaped, matrix stabilized superconductor ribbons used in accordance with this invention are described in U.S. Pats. 3,432,-783 and/or 3,423,706 by the co-inventor of this application, and thus are incorporated by reference herein.

Should a plurality of the above-described cryogenically cooled, matrix stabilized, superconductor ribbons be connected in parallel and interleaved to form forward and return conductors, as described in more detail hereinafter, mimimal magnetic fields will be produced at the conductor surfaces. Also, such parallel, interleaved, forward and return conductors, will provide low inductance, low magnetic stored energy, very low stray or interference fields, compact size and ease of fabrication in accordance with this invention, as described in more detail hereinafter. As will be understood by one skilled in the art from the description herein, such parallel interleaved conductor ribbons can be used for the transmission of alternating currents, such as in underground cryogenic cables for A.C. power transmission in the range of up to 5000 megawatts or more.

Referring now to FIG. 1 of the drawings, the superconductor transmission line 11 of one embodiment of this invention, conductors alternating current at 60 Hz. In one example, a simulated line 0.5 m. long consisting of 50 forward $Nb_3Sn$ superconductor ribbons 15 and 50 return conductors ribbons 17 and having a cross sectional area of approximately 3 cm.$^2$ had a power loss of 0.15 watt at a current of 10,000 amps. By suitable scaling, the line 11 of this invention provides a loss of 3 watts/meter for 100,000 amps with a cross-sectional area of 30 cm.$^2$. Suitable cryogenic cooling means are provided around the line 11.

In operation, line 11 advantageously has a means 21 forming a container 23 with cryogenic cooling fluid 24 circulating therein, such as from a suitable liquid helium source 25 that connects with container 23 to flow fluid from inlet 27 to outlet 29 along line 11 between the line 11 and cryogenic insulator 30. Inside the container 23, the parallel ribbons 15 and 17 advantageously form a plurality of laminae 31 in an interleaved composite structure 33 having a rectangular fillet-shaped cross-sectional area 34 and insulating means 35 sandwiched between the laminae 31. Advantageously, this insulating means 35, comprises an organic electrical insulation, such as polytetrafluoroethylene, polycarbonate, filled polyolefin or polyethyleneterephthalate, but other insulators, such as ceramic insulators may be used for insulating means 35.

Advantageously, the rectangular cross-section, fillet-shaped, matrix stabilized ribbons 15 and 17 have smoothly curving rounded edges 36 and are electrically coupled by interleaving means 37 to form two discrete electrically conducting pathways 39 and 41 in parallel opposition. To this end, for example, each of the ribbons 17 couple in parallel to other like ribbons to form a first pathway 39 that is separate and distinct from the other pathway 41 in which the adjacent ribbons 15 are coupled in parallel so as to minimize the inductance between the two pathways 39 and 41 in parallel opposition. Also, advantageously interleaving means 37 has connections 43 from the inside to the outside of container 23 for coupling the first and second pathways 39 and 41 to a suitable power source 45 at one end 47 of line 11, and to a suitable load 49 at the other end 51 of line 11. Thus, an alternating current source 45 causes a first current to flow seriatim in a first direction in a means 43, which comprises cable 53, a first shoe 55, ribbons 17 forming parallel connected forward conductors 57, 59 and 61, another or second shoe 55' and cable 53' to load 49, and a like parallel opposing second current of opposite polarity to flow in parallel in ribbons 15 by like means. In this regard, it will be understood that this opposing current flows seriatim from load 49 through cable 71, shoe 73, parallel connected return conductors 75, 77, and 79, shoe 81 and cable 83 to source 45. It will thus be understood that the parallel connected conductors 75, 77 and 79 form the pathway 41 of parallel ribbons 15 so as to counterbalance the fields from the parallel connected conductors 57, 59 and 61, which form the pathway 39 of parallel ribbons 17. Thus, equal and opposite currents flow in the two respective pathways 39 and 41. Stated another way, the currents in pathways 39 and 41 rise and fall together to produce equal and opposite corresponding fields that tend to cancel each other, thereby to provide minimum induction between the two pathways 39 and 41, as well as between the adjacent ribbons and conductors thereof.

Five types of ribbons 15 and 17 were tested. Three were commercial $Nb_3Sn$ fillet-shaped ribbon 1.27 cm. wide, which were identified as RCA 600, RCA 900, and GE 600 respectively to refer to the manufacturer and their D.C. critical field $H_c$ in a transverse field of 100 kg. The RCA ribbons, comprised a Hasteloy substrate surrounded by a vapor deposited $Nb_3Sn$ layer having a silver electroplated coating thereon which formed the rounded edges 36, although these rounded edges may be formed by rolling. The $Nb_3Sn$ layer was nominally 6.4 micron thick for the RCA 600 ribbon, and 9.5 micron for the RCA 900 ribbon. The GE ribbon was made by diffusing tin into a niobium substrate so as to produce a reacted interface nominally 6.4 micron thick. The complete ribbon, comprised two such substrates tinned together and clad with a copper coating forming a matrix stabilizer. All three $Nb_3Sn$ ribbons were ∼.012 cm. thick overall. Advantageously, the ribbons of FIG. 1 were fillet-shaped with smooth rounded edges 36 to eliminate the concentration of voltage gradients at the edges 36. However, it will be understood that braided superconductors can alternatively be used. The last two sample ribbons, identified as ribbons "A" and "B," were braided from twisted multifilamentary NbTi wire, as described in the above-mentioned copending application, now U.S. Pat. 3,638,154.

In ribbon "A" the wire, supplied by Airco, comprised .020 cm. dia. copper matrix containing 121 NbTi cores, 9.1 micron dia. each. This wire was twisted axially 1.2 turns per cm. before braiding. Ribbon "B" was made of Supercon brand wire containing 400 cores, 7.1 micron dia. each, twisted 5/cm. Each braid was 1.7 cm. wide and contained 132 wires transposed every 15 cm. of length.

The volume of superconductor material per meter of ribbon in the above-mentioned samples were .161, .242, .323, 1.05, and 2.10 cm.$^3$ respectively for RCA 600, RCA 900, GE 600, Braid "A" and Braid "B."

Losses were measured by measuring the boil-off of the cryogenic cooling fluid. Such a system was described by G. H. Morgan et al. in J. Appl. Phys. 40, 1821 (1969). The scatter of data in a given run was of the order of 10 mW, but perhaps twice that amount over several repeated runs. Measurements were made up to a maximum current of 1000 a. (RMS). Frequencies between 20 and 60 Hz. were obtained with a conventional motor alternator set 45. The harmonic content was of the order of 5%. Measurements using 60 Hz. mains as a source 45 gave the same results as those obtained with the motor alternator set.

Using the above-described ribbons, tests were conducted using bifilar coils wound on phenolic formers of 15 cm. dia. The coil windings were insulated from each other either by polyethyleneterephthalate resin ribbon or by glass fiber tape. The overall winding thickness varied between 1.5 and 2.5 cm., depending on the number of turns (between 40 and 100) and the insulation thickness (between .012 and .051 cm.). The assembled winding was laced snugly to the phenolic former.

The magnetic field in the space surrounding a given turn of the described ribbons 15 and 17 is very nearly that of the isolated ribbon as long as the number of turns is of the order of 40 or greater. For the 1.27 cm. wide ribbons 15 and/or 17, the peak value of this field for a uniformly distributed sinusoidal current from source 45 is approximately $H_m = .7 I_{RMS}$, where $H_m$ is in oersted and $I_{RMS}$ is in amperes. The respectively observed inductances of the 40-turn coils with .051, .025, and .012 cm. thick insulating means 35, were respectively, .41, .26, and .17 $\mu$H. On the other hand, the line 11 of this invention has paired, interleaved, ribbon-shaped conductors 15 and 17 forming parallel interleaved alternating current pathways 39 and 41 connected in parallel opposition. The line inductance in this particular case is $(20)^2 = 400$ times smaller for the same number of ribbons of the same length as in the above tests.

A series of runs showed the losses to be proportional to the length of ribbons 15 and 17 and independent of the thickness of insulating means 35 for the range of lengths and thicknesses used. The results were plotted in terms of the quantity (power loss/unit area), where the area was taken as that of the ribbon surface, i.e. 2×the width×the length. This quantity is not related to the superconductor content. In the case of the braid it is not related to the superconductor surface area.

Figure 2:
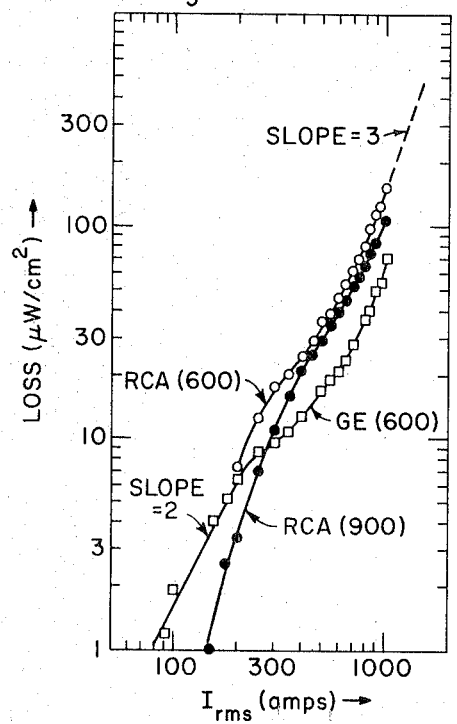
FIG. 2 is a graphic illustration of the A.C. losses of the embodiment of FIG. 1 having parallel fillet shaped superconductors.

Losses for the $Nb_3Sn$ fillet-shaped superconductor ribbon in samples of line 11 at 60 Hz. are illustrated in FIG. 2. Data points at 20 Hz., to which reference is made herein, have not been shown for the sake of clarity. For the RCA ribbons, the losses were proportional to frequency for all the currents used and varied more slowly than $I^3$. At approximately 100 a. and 150 a. respectively for the RCA 600 and the RCA 900 ribbons, the losses dropped very rapidly below a measurable level, i.e. below ~1 $\mu$w./cm.$^2$. One sample of RCA 600 material which was run after its silver coating was removed, had a power dissipation below the level of detectability up to ~180 a., where the coil went normal. It was theorized that since this current was in the region where the losses first became detectable for the plated ribbon, this indicated a discontinuity in the loss mechanism.

Losses in the G.E. ribbon were proportional to frequency above about 300 a. and were half as large as those of the RCA 600 ribbon. It was theorized that this illustrated an inverse correlation between losses and the amount of $Nb_3Sn$. At lower currents the GE material had relatively large losses that varied quadratically with current and were about five times smaller at 20 Hz. than at 60 Hz. On the basis of calculations and the fact that these losses did not continue above 300 a., eddy currents were ruled out as their cause. It was further theorized that the losses here may have been associated with the large amounts of unreacted niobium in the material used in these specific tests.

The presence of mechanical vibration was also found to be important at high currents. In this regard, coating the ribbons 15 and 17 in line 11 with grease 91 reduces the losses by 15% at 1000 a. Thus, in accordance with this invention the grease coated ribbons effects the reduction in the A.C. losses in line 11 due to the variable currents therein in accordance with the reduction in the vibration in the line.

Figure 3:
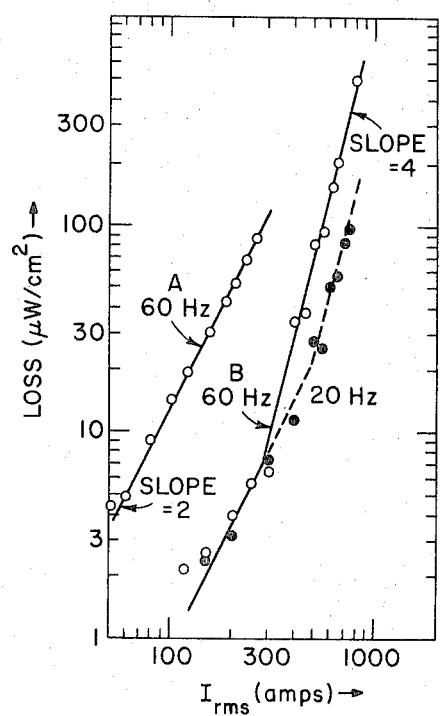
FIG. 3 is a graphic illustration of A.C. losses of the embodiment of FIG. 1 of the apparatus of this invention having a braided superconducting ribbon.

FIG. 3 illustrates the data for braided, multifilamentary, cryogenically cooled, matrix stabilized ribbons 15 and 17, such as those described in the above-mentioned copending application, where it is understood that the ribbons 15 and 17 involved have an arrangement in line 11 as illustrated by the interleaved configuration of FIG. 1 in accordance with this invention. The area by which the losses were divided corresponds to the above-described area. However, the actual .020 cm. wire surface was about three times the smoothed over ribbon surface.

Losses for ribbon "A" were relatively large and varied as $I^2$ at both 60 Hz. and 20 Hz. The 20 Hz. losses, which again are not shown for clarity, were five times smaller than those at 60 Hz. A substantial fraction of the 60 Hz. loss was found by a D.C. measurement to be due to contact resistance between the braid and the $Nb_3Sn$ ribbon lead-in. Advantageously, therefore, this contact resistance is eliminated in accordance with this invention by providing lead-ins that are nonresisting continuations of the ribbons 15 and 17, respectively. To this end, shoes 55, 55', 73 and 81 have a multiple U-shaped configuration, and comprise a superconductor metal that is carefully brazed in uniform contact to the multifilamentary superconductors or the rounded edges 36 of ribbons 15 and 17, respectively, and to lead-in cables 53, 53', 71 and 83.

For ribbon "B," the losses varied as $I^4$ above I≃300 a. and were proportional to frequency. At lower currents, the losses varied approximately as $I^2$ and were independent of frequency, where the losses were due to a spurious contact resistance of $2 \times 10^{-7}$ ohm. However, this is reduced by using ribbons 15 and 17 having shaped, rounded edges 36 by braiding that avoids exposed points, and resistance-free superconducting connections. All of the $Nb_3Sn$ ribbons and braid "B" had A.C. critical currents in excess of 1000 a. Braid "A" went into its normal resistance state at 500 a.

In a practical embodiment of the transmission line 11 of this invention, low voltages are advantageously employed for high currents. On the basis of the results in FIGS. 2 and 3 line 11 carries 105,000 a. in the forward and the return directions in pathways 39 and 41 with a dissipation (at 4.2 k.) of 0.39 w./m. For a cross-sectional area 13 of 370 cm.$^2$, the inductance of this line is $2 \times 10^{-10}$ H/m. ($10^{-4}$ ohm/mile at 60 Hz.). Since the capacitance is about .27 $\mu$F/m., the charging current for this example is 980 a./km. for a line 11 operating at 10 kv. at 60 Hz. The line 11 of the embodiment of FIG. 1, thus interleaves the parallel, spaced apart, edge shaped, insulated matrix stabilized ribbons thereof that are connected to source 45 so as to effect the reduction of the magnetic fields produced at the surface of the ribbons in accordance with said interleaving.

Figure 4:
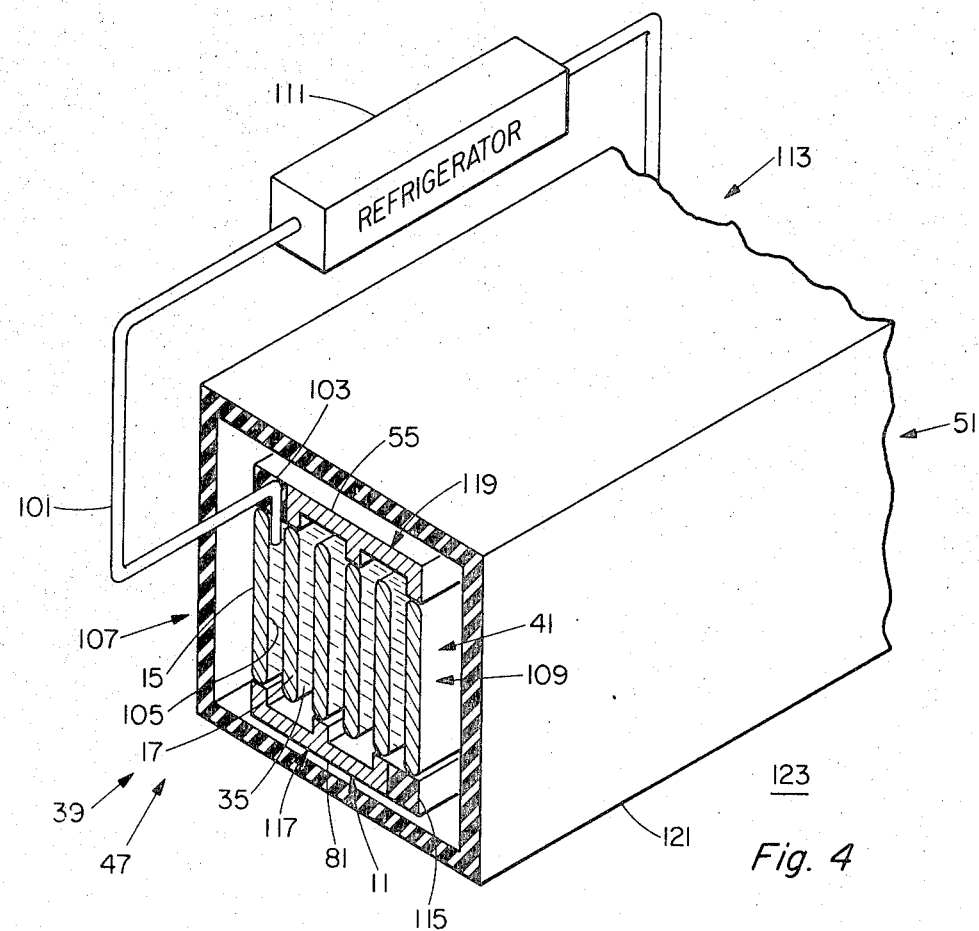
FIG. 4 is a partial three-dimensional view of another embodiment of the apparatus of FIG. 1.

Referring now to FIG. 4, in another embodiment of the apparatus of this invention, the insulating means 35 is a cryogenic cooling fluid, such as liquid helium. In this embodiment this cooling fluid enters end 47 of line 11 through a pipe 101 in insulator 103 and circulates in a serpentine fashion across the faces 105 of parallel ribbons 15 and 17 forming like pathways 39 and 41 by passing from side 107 to side 109 of line 11 and along line 11 to end 51 back to a refrigerator source 111. In this embodiment, cooling sections 113 of line 11 are formed by refrigerators up to 10 miles apart. Also an insulator 115 having covers 117 and 119 along the above-described small shoes 55, and 81, etc. contain the cooling fluid insulation means 35 inside line 11, while an insulated evacuated box 121 substantially prevents large heat flow into line 11 from ambient 123. The line 11 of the embodiment of FIG. 4, will thus be understood to interleave the parallel spaced apart edge shaped insulated matrix stabilized ribbons that are connected to source 45 so as to effect the reduction of the magnetic fields produced at the surfaces of the ribbons in accordance with said interleaving.

Figure 5:
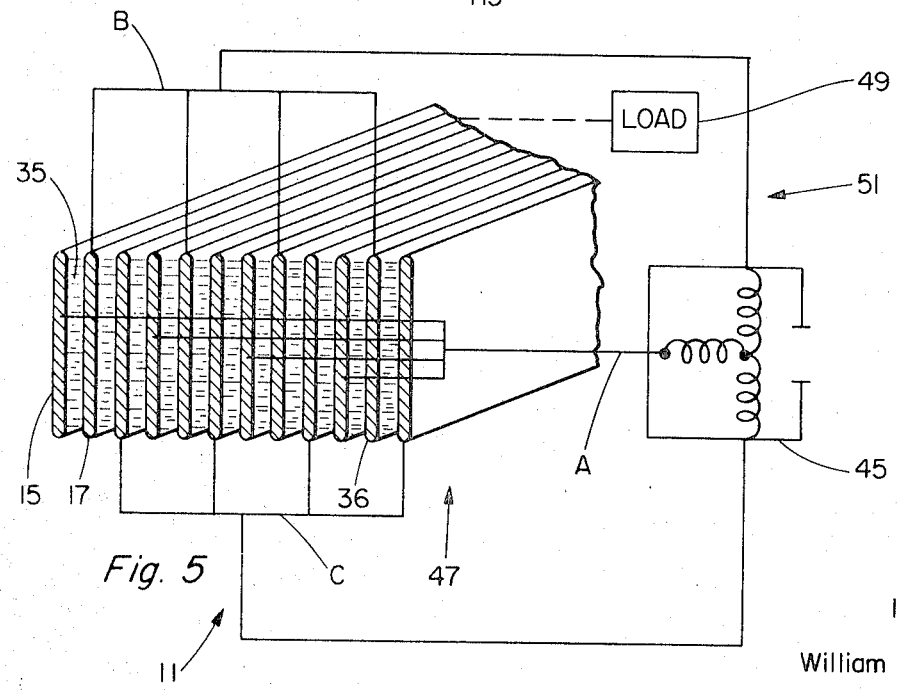
FIG. 5 is a partial three-dimensional view of still another embodiment of the apparatus of FIG. 1.

Referring now to FIG. 5, in still another embodiment of the apparatus of this invention, the source 45 provides an alternating, sinusoidal, three-phase, current in parallel ribbon 15 and/or 17 that are arranged to form parallel current paths A, B and C in line 11 wherein the sum of the currents in $A+B+C =$ zero. This provides a balanced condition in line 11 in paths A, B and C having a three-phase balanced load 49 even when there is a fault except a fault to ground, e.g., a zero sequential current. The line 11 of the embodiment of FIG. 5 thus interleaves the parallel spaced apart, edge shaped, insulated, matrix stabilized ribbons thereof to source 45 to conduct the varying currents from source 45 so as to effect the reduction of the magnetic fields produced at the surfaces of the ribbons in accordance with said interleaving.

While the insulation means 35 of FIG. 5 is cryogenic liquid He, it is understood that this liquid He may be the liquid He of FIG. 4, or alternately the solid insulator 35 of FIG. 1, in which cases the corresponding hardware shown in FIGS. 1 and 4 is employed with the interleaving apparatus of FIG. 5.

While the above has described three embodiments operating at low temperatures up to just below the critical temperature of the super-conductor for ribbons 15 and 17, it is understood that the ribbons 15 and 17 may alternately be operated at supercritical helium temperatures to improve the overall efficiency. Thus, the non-inductive line 11 of this invention is ideally suited for use for transmitting high power pulsed or D.C. currents as well as alternating currents.

This invention has the advantage of providing a compact, easy to fabricate, low loss noninductive, superconducting transmission line for parallel, interleaved, balanced alternating currents, pulsed currents and/or D.C. currents. In this regard, the parallel interleaved arrangement of the spaced apart ribbons of this invention provides minimal stray fields. Stated another way, this invention interleaves parallel, insulated, spaced apart, matrix stabilized, superconductor ribbons by conducting parallel balanced varying currents therein so as to effect the reduction of the magnetic fields at the surfaces of the ribbons in accordance with said interleaving of said ribbons. Additionally, means are provided for reducing vibrations, eddy currents, and lead losses, and for allowing the maximum interribbon voltage in the superconducting transmission line of this invention.

What is claimed is:

1. A transmission line for conducting magnetic field producing currents, comprising parallel spaced apart, smoothly curving edge-shaped ribbons of a superconductor material that is interleaved to conduct counterbalanced magnetic field producing currents in parallel opposition so as to effect the reduction of the magnetic fields at the surfaces of the respective ribbons in accordance with said interleaving, and means for maintaining said superconductor material at a temperature below the critical temperature thereof, said means for maintaining said superconductor material at a temperature below said critical temperature forming an electrical insulator between said ribbons.

2. A low-loss conductor for alternating current power transmission, comprising:
   (a) means defining a containment for a cryogenic coolant;
   (b) inside said containment, a plurality of superconducting means arranged in a composite structure, each of said superconducting means separated from neighboring of said superconducting means by electrical insulation means, said superconducting means electrically coupled so as to provide at least two discrete electrically conducting magnetic field producing pathways separated from each other; and
   (c) means extending outside said containment for electrically coupling the ends of each of said pathways for circulating opposing currents in said pathways so as to effect a substantial magnetic field counterbalance between said pathways while said pathways are immersed in said coolant;
      said coolant maintaining said superconducting means at a temperature below the critical temperature thereof and forming an electrical insulator between said superconducting means.

References Cited

UNITED STATES PATENTS

| | | | |
|---|---|---|---|
| 3,347,975 | 10/1967 | Shannon | 174—16 B |
| 3,548,351 | 3/1967 | Fairbanks et al. | 335—216 |
| 3,638,154 | 1/1972 | Sampson et al. | 335—216 |
| 3,502,783 | 3/1970 | Aupoix et al. | 174—15 C |
| 3,396,355 | 8/1968 | Hochart et al. | 174—DIG. 6 |

FOREIGN PATENTS

| | | | |
|---|---|---|---|
| 1,908,885 | 8/1970 | Germany | 174—DIG. 6 |

OTHER REFERENCES

IBM Technical Disclosure Bulletin, p. 43.
J. J. Lentz: Superconducting Transmission Line, vol. 5, No. 11, April 1963.

BERNARD A. GILHEANY, Primary Examiner

A. T. GRIMLEY, Assistant Examiner

U.S. Cl. X.R.

174—27, 99 B, DIG. 6; 335—216